United States Patent
Jiang et al.

(10) Patent No.: US 11,750,100 B2
(45) Date of Patent: Sep. 5, 2023

(54) MULTIPHASE SWITCHING CONVERTER WITH CURRENT MODE CONSTANT ON-TIME CONTROL

(71) Applicant: Chengdu Monolithic Power Systems Co., Ltd., Chengdu (CN)

(72) Inventors: Lijie Jiang, Hangzhou (CN); Binci Xu, Hangzhou (CN); Chao Liu, Sunnyvale, CA (US)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 108 days.

(21) Appl. No.: 17/555,757

(22) Filed: Dec. 20, 2021

(65) Prior Publication Data
US 2022/0247316 A1    Aug. 4, 2022

(30) Foreign Application Priority Data

Jan. 29, 2021   (CN) .......................... 202110126637.5

(51) Int. Cl.
*H02M 3/158*   (2006.01)
*H02M 1/32*    (2007.01)
*H02M 1/00*    (2006.01)

(52) U.S. Cl.
CPC ....... *H02M 3/1584* (2013.01); *H02M 1/0025* (2021.05); *H02M 1/32* (2013.01)

(58) Field of Classification Search
CPC ..... H02M 3/1584; H02M 1/32; H02M 1/0025
See application file for complete search history.

(56) References Cited

U.S. PATENT DOCUMENTS

| | | |
|---|---|---|
| 9,071,142 B2 | 6/2015 | Eric |
| 9,081,397 B2 | 7/2015 | Lijie |
| 9,263,876 B2 | 2/2016 | Lijie |
| 9,356,510 B2 | 5/2016 | Lijie |
| 9,479,043 B2 | 10/2016 | Lijie |
| 9,660,534 B2 | 5/2017 | Lijie |
| 10,348,197 B2 | 7/2019 | Chao |
| 10,498,241 B2 | 12/2019 | Xiaokang |
| 2013/0293207 A1* | 11/2013 | Wei ............... H02M 3/1584 323/272 |
| 2014/0022684 A1* | 1/2014 | Jiang ............. H02M 3/1584 361/93.1 |
| 2019/0207518 A1* | 7/2019 | Wu ................ H02M 3/1584 |
| 2020/0007023 A1* | 1/2020 | Wu ................ H02M 3/1584 |

* cited by examiner

*Primary Examiner* — Alex Torres-Rivera
(74) *Attorney, Agent, or Firm* — Perkins Coie LLP

(57) ABSTRACT

A controller for a multiphase switching converter has a set generation circuit, a frequency divider, and a plurality of sub control circuits. The set generation circuit provides a set signal based on an output voltage and a total current flowing through the plurality of switching circuits. The frequency divider provides a plurality of frequency division signals based on the set signal. The plurality of sub control circuits provides a plurality of switching control signals to control the plurality of switching circuits respectively. Such that when the total current is larger than a current reference, one of the plurality of switching circuits maintains off temporarily, until the total current is less than the current reference, then the one of the plurality of switching circuits are turned on based on the output voltage and a voltage reference.

21 Claims, 12 Drawing Sheets

US 11,750,100 B2

MULTIPHASE SWITCHING CONVERTER WITH CURRENT MODE CONSTANT ON-TIME CONTROL

CROSS-REFERENCE TO RELATED APPLICATIONS

This application claims the benefit of CN application 202110126637.5, filed on Jan. 29, 2021, and incorporated herein by reference.

TECHNICAL FIELD

The present invention generally relates to electronic circuits, and more particularly but not exclusively, to multiphase switching converter.

BACKGROUND

Recently, with emergence of high-performance processors, switching converters with smaller output voltage and larger output current are needed, with higher and higher requirements on thermal performance and transient response performance. Multiphase switching converters are widely used because of their superior performance. A multiphase switching converter comprises a plurality of switching circuits, and outputs of the plurality of switching circuits are coupled together to provide an output voltage to a load. However, it is necessary to design a multiphase switching converter, which can not only provide overcurrent protection for each of the plurality of switching circuits, but also ensure a stable operation.

SUMMARY

Embodiments of the present invention are directed to a controller for a multiphase switching converter, the multiphase switching converter having a plurality of switching circuits coupled together to provide an output voltage. The controller comprises a set generation circuit, a frequency divider and a plurality of sub control circuits. The set generation circuit provides a set signal based on the output voltage and a total current flowing through the plurality of switching circuits. The frequency divider provides a plurality of frequency division signals based on the set signal. The plurality of sub control circuits provides a plurality of switching control signals to control the plurality of switching circuits respectively. Each of the plurality of sub control circuits receives one of the plurality of frequency division signals and provides a corresponding one of the plurality of switching control signals accordingly. When the total current is larger than a current reference, one of the plurality of switching circuits maintains off temporarily, until the total current is less than the current reference, then the one of the plurality of switching circuits is turned on based on the output voltage and a voltage reference.

Embodiments of the present invention are also directed to a control method for a multiphase switching converter, the multiphase switching converter having a plurality of switching circuits coupled together to provide an output voltage. Providing a voltage control signal based on the output voltage and a voltage reference. Providing a current control signal based on a total current flowing through the plurality of switching circuits and a current reference. Providing a set signal based on the voltage control signal and the current control signal. Providing a plurality of switching control signals based on the set signal, to turn on the plurality of switching circuits successively. Turning off a corresponding one of the plurality of switching circuits based on an on-time control signal to control an on-time period of the corresponding one of the plurality of switching circuits. When the total current is larger than the current reference, the corresponding one of the plurality of switching circuits maintains off temporarily, until the total current is less than the current reference, the corresponding one of the plurality of switching circuits is turned on based on the output voltage.

Embodiments of the present invention are further directed to a multiphase switching converter. The multiphase switching converter has a plurality of switching circuits coupled together to provide an output voltage and a controller. The controller provides a plurality of switching control signals to turn on the plurality of switching circuits successively based on the output voltage and a total current flowing through the plurality of switching circuits. When the total current is larger than the current reference, the corresponding one of the plurality of switching circuits maintains off temporarily, until the total current is less than the current reference, the corresponding one of the plurality of switching circuits is turned on based on the output voltage.

BRIEF DESCRIPTION OF THE DRAWING

The present invention can be further understood with reference to the following detailed description and the appended drawings, wherein like elements are provided with like reference numerals.

DETAILED DESCRIPTION

Figure 1:
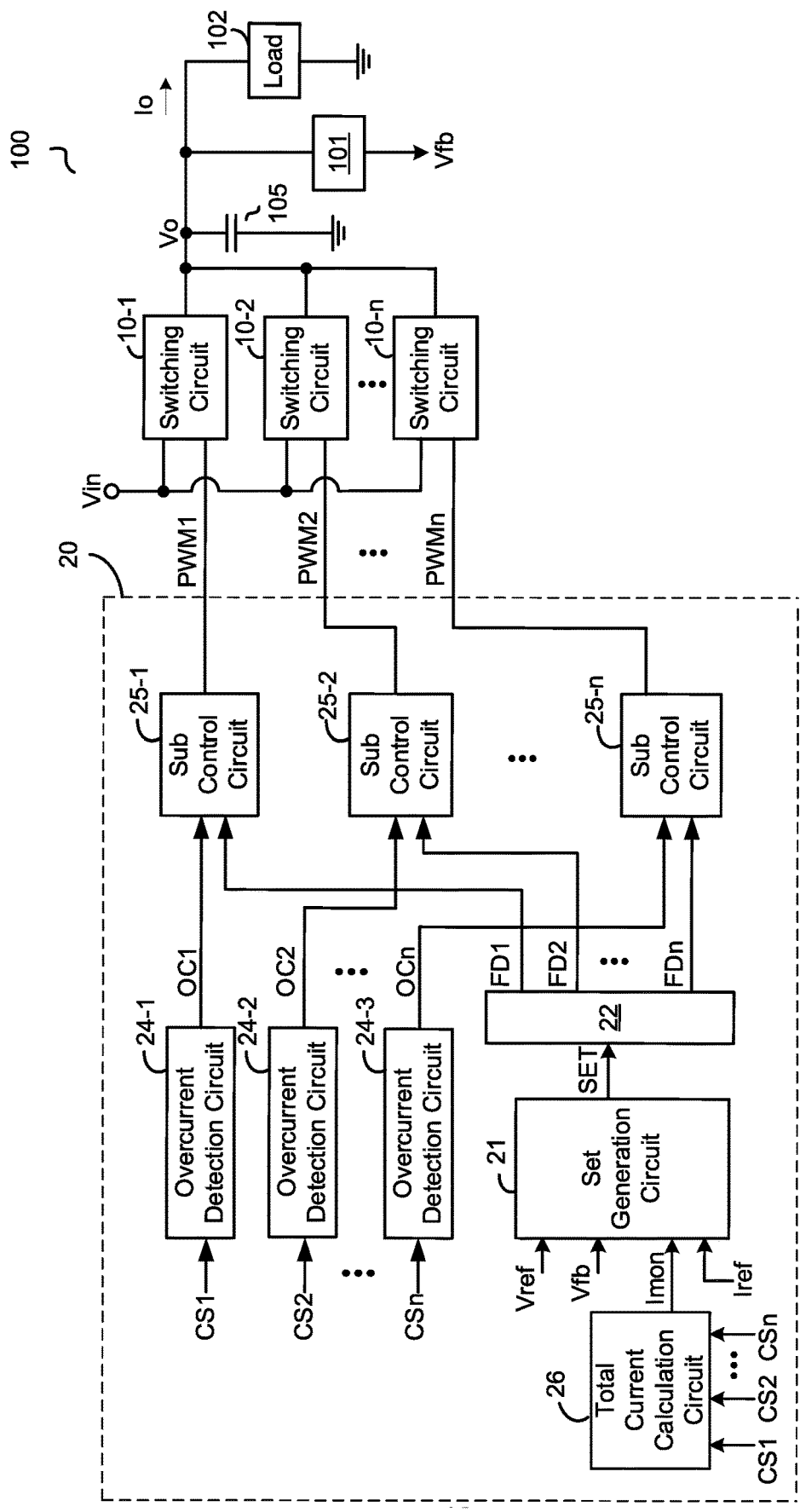
FIG. 1 is a schematic block diagram of a multiphase switching converter 100 in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Embodiments of the present invention provide a multiphase switching converter having a plurality of switching circuits. Normally, each switching circuit is turned on successively based on an output voltage of the multiphase switching converter and a total current of the plurality of switching circuits. The "total current" is a sum of a plurality of currents, each of the plurality of currents flows one of the plurality of switching circuits respectively. In other words, the total current is a current provided to a load by the multiphase switching converter. When the total current is larger than a current reference, a corresponding switching circuit is temporarily maintained off until the total current is less than the current reference, and then the corresponding switching circuit is turned on based on the output voltage. When one of the switching circuits is detected as overcurrent, other of the switching circuits are successively turned on and off normally while the one of the switching circuits is skipped. "Overcurrent" here means that a current flowing through the one of the switching circuits is larger than an allowed maximum current. Embodiments described below employ a constant on-time control as an example.

FIG. 1 is a schematic block diagram of a multiphase switching converter 100 in accordance with an embodiment of the present invention. The multiphase switching converter 100 is configured to provide an output voltage Vo to power a load. The multiphase switching converter 100 comprises a controller 20 and a plurality of switching circuits 10-1, 10-2 . . . 10-n, where n is an integer greater than or equal to two. The plurality of switching circuits 10-1, 10-2 . . . 10-n are coupled in parallel between an input voltage Vin and the output voltage Vo. Switching circuits 10-1, 10-2, . . . 10-n can employ any suitable topology, such as synchronous or asynchronous step-up/step-down converters, forward converters, flyback converters, and so on. An output capacitor 105 is coupled between the output voltage and a reference ground.

The controller 20 provides a plurality of control signals PWM1, PWM2 . . . PWMn to control the plurality of switching circuits 10-1, 10-2 . . . 10-n respectively. The controller 20 comprises a set generation circuit 21, a frequency divider 22, and a plurality of sub control circuits 25-1, 25-2 . . . 25-n. The set generation circuit 21 provides a set signal SET based on the output voltage Vo and the total current Io. For example, the set signal SET is generated based on a comparison result between a voltage reference Vref and a voltage feedback signal Vfb representative of the output voltage Vo, and a comparison result between the current reference Iref and a current feedback signal Imon representative of the total current Io. The frequency divider 22 has an input terminal and a plurality of output terminals, wherein the input terminal of the frequency divider 22 is coupled to the set generation circuit 21 to receive the set signal SET, and the plurality of output terminals of the frequency divider 22 provide a plurality of frequency division signals FD1, fD2, . . . FDn respectively based on the set signal SET. A sub control circuit 25-i (i=1, 2 . . . n) is coupled to a corresponding output terminal of the frequency divider 22 to receive a corresponding frequency division signal FDi, and the sub control circuit 25-i provides a corresponding switching control signal PWMi based on the frequency division signal FDi. So that when the current feedback signal Imon is greater than the current reference Iref, the corresponding switching circuit 10-i remains off, until the current feedback signal Imon is less than the current reference Iref, the corresponding switching circuit 10-i is turned on again based on the output voltage Vo and the voltage reference Vref. E.g., when the voltage feedback signal Vfb is less than the voltage reference Vref, the corresponding switching circuit 10-i is turned on.

In one embodiment, the controller 20 further comprises a plurality of overcurrent detection circuits 24-1, 24-2 . . . 24-n. An overcurrent detection circuit 24-i (i=1, 2 . . . n) has an input terminal and an output terminal. The input terminal of the overcurrent detection circuit 24-i is coupled to the corresponding switching circuit 10-i to detect whether the corresponding switching circuit 10-i is overcurrent based on a current flowing through the corresponding switching circuit 10-i, and provides an overcurrent signal OCi at the output terminal. For example, based on a current sensing signal CSi (i=1, 2 . . . n) representative of the current flowing through the corresponding switching circuit 10-i, the overcurrent detection circuit 24-i provides the overcurrent signal OCi to indicate if the corresponding switching circuit 10-i is overcurrent. In one embodiment, when the corresponding switching circuit 10-i is detected as overcurrent, the corresponding switching circuit 10-i is skipped, for example, keeping the corresponding switching circuit 10-i off and turning on and off other switching circuits normally. In one embodiment, the sub control circuit 25-i (i=1, 2 . . . n) is coupled to the output terminal of the overcurrent detection circuit 24-i to receive the overcurrent signal OCi, and the sub control circuit 25-i provides the corresponding switching control signal PWMi based on the frequency division signal FDi and the overcurrent signal OCi.

In one embodiment, the controller 20 further comprises a total current calculation circuit 26. The total current calculation circuit 26 has a plurality of input terminals and an output terminal, the plurality of input terminals of the total current calculation circuit 26 are respectively coupled to the plurality of switching circuits 10-1, 10-2 . . . 10-n to receive the plurality of current sensing signals CS1, CS2 . . . CSn, and the output terminal of the total current calculation circuit 26 provides the current feedback signal Imon representative of the total current Io based on the plurality of current sensing signals CS1, CS2 . . . CSn.

In one embodiment, the multiphase switching converter 100 further comprises a voltage sense circuit 101. The voltage sense circuit 101 senses the output voltage Vo and provides the voltage feedback signal Vfb based on the output voltage Vo.

Control of the total current Io by the multiphase switching converter 100 increases safety of the load. The multiphase switching converter 100 can automatically and smoothly transits between adjusting the output voltage Vo and the total current Io, and current imbalance can be avoided between the plurality of switching circuits caused by a continuous increase of the total current Io.

Figure 2:
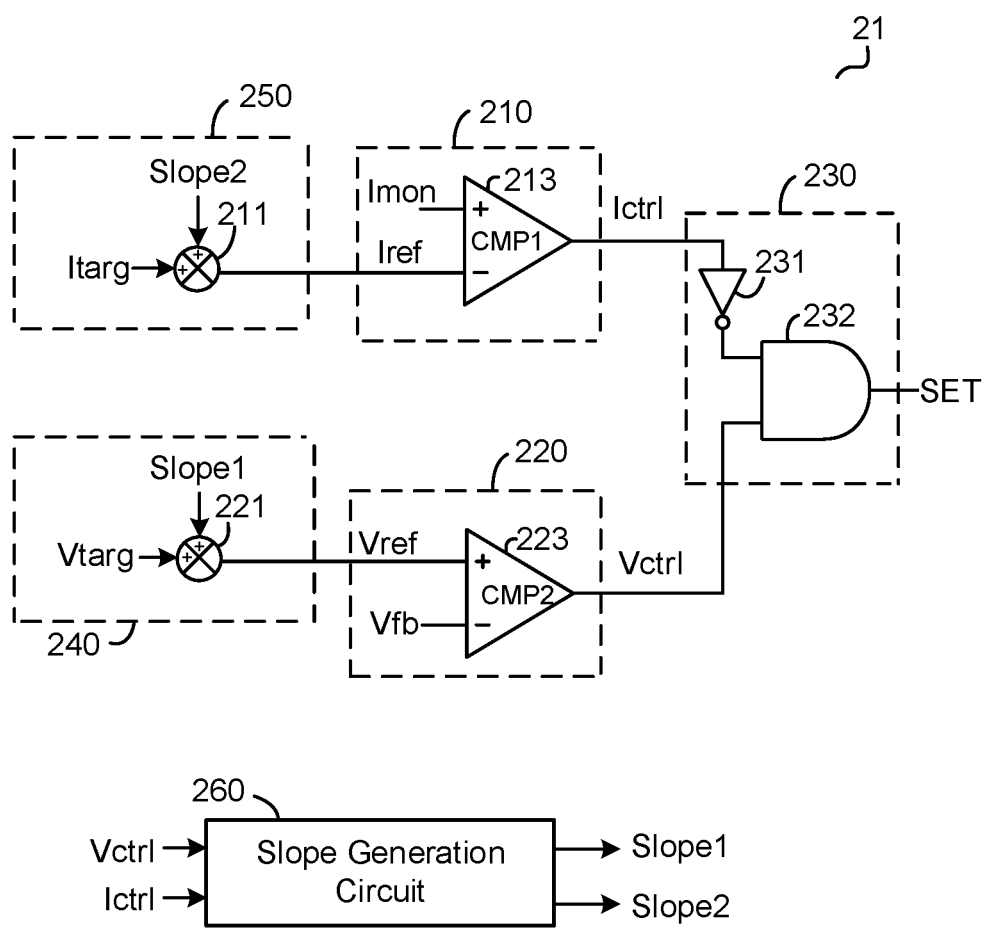
FIG. 2 is a schematic diagram of a set generation circuit 21 in accordance with an embodiment of the present invention.

FIG. 2 is a schematic diagram of a set generation circuit 21 in accordance with an embodiment of the present invention. In the example of FIG. 2, the set generation circuit 21 comprises a voltage control circuit, a total current control circuit and a logic circuit 230. The voltage control circuit comprises an operation circuit 240 and a comparison circuit 220. The total current control circuit comprises an operation circuit 250 and a comparison circuit 210. The voltage control circuit provides a voltage control signal Vctrl via comparing the voltage feedback signal Vfb with the voltage reference Vref. The total current control circuit provides a current control signal Ictrl via comparing the current feedback signal Imon with the current reference Iref. The logic circuit 230 provides the set signal SET based on the voltage control signal Vctrl and the current control signal Ictrl. When the current control signal Ictrl is at a first status (e.g., low voltage level), the logic circuit 230 provides the set signal SET according to the voltage control signal Vctrl. When the current control signal Ictrl is at a second status (e.g., high voltage level), the logic circuit 230 provides the set signal SET according to the current control signal Ictrl. In one embodiment, the logic circuit 230 comprises a NOT gate 231 and an AND gate 232. The NOT gate 231 has an input terminal configured to receive the current control signal Ictrl and an output terminal configured to provide an inverse signal of the current control signal Ictrl. The AND gate 232 comprises a first input terminal, a second input terminal and an output terminal. The first input terminal of the AND gate circuit 232 is coupled to the output terminal of the NOT gate 231, the second input terminal of the AND gate 232 receives the voltage control signal Vctrl, and the output terminal of the AND gate circuit 232 provides the set signal SET according to the voltage control signal Vctrl and the current control signal Ictrl.

In one embodiment, the operation circuit circuit 240 provides the voltage reference Vref according to a sum of an expected voltage signal Vtarg and a slope compensation signal Slope1 (Vtarg+Slope1). The expected voltage signal Vtarg represents a voltage set-point required by the load, e.g. 1V. In the embodiment shown in FIG. 2, the operation circuit 240 comprises an adder 221, which receives the expected voltage signal vtarg and the slope compensation signal Slope1, and provides the voltage reference Vref accordingly.

In one embodiment, the operation circuit 250 provides the current reference Iref according to a sum of an expected total current signal Itarg and a slope compensation signal Slope2 (Itarg+Slope2). The expected total current signal Itarg represents a current required by the load, e.g., 200A. In the embodiment shown in FIG. 2, the operation circuit 250 comprises an adder 211, which receives the expected total current signal Itarg and the slope compensation signal Slope1, and provides the current reference Iref accordingly.

In the embodiment shown in FIG. 2, the set signal generation circuit 21 further comprises a slope generation circuit 260 that provides the slope compensation signal Slope1 and the slope compensation signal Slope2. In one embodiment, the slope generation circuit 260 provides the slope compensation signal Slope2 according to the current control signal Ictrl and the slope compensation signal Slope1 according to the voltage control signal Vctrl.

Figure 3:
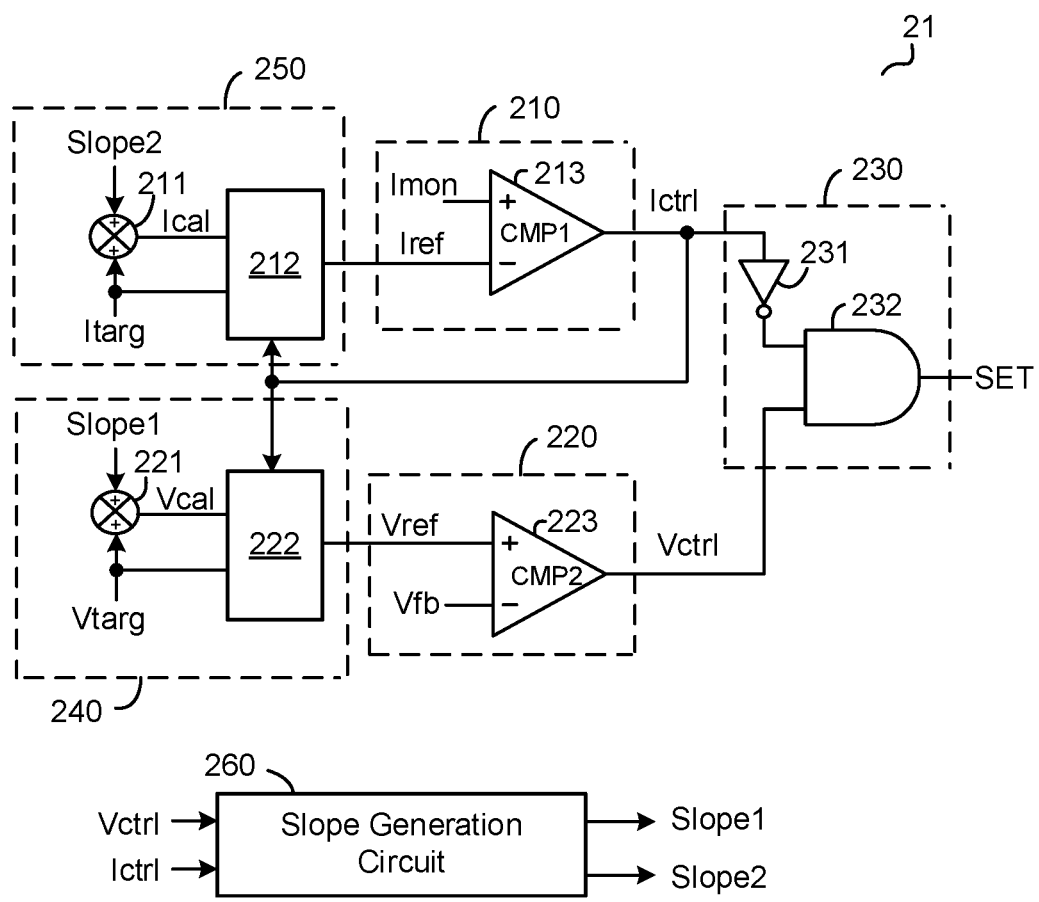
FIG. 3 is a schematic diagram of the set generation circuit 21 in accordance with another embodiment of the present invention.

FIG. 3 is a schematic diagram of a set generation circuit 21 in accordance with another embodiment of the present invention. In the embodiment of FIG. 3, the operation circuit 240 further comprises a selection circuit 222. The selection circuit 222 selects an operation signal Vcal or the expected voltage signal Vtarg as the voltage reference Vref based on the current control signal Ictrl, wherein the operation signal Vcal is generated based on the sum of the expected voltage signal Vtarg and the slope compensation signal Slope1 (Vtarg+Slope1). In one embodiment, when the current feedback signal Imon keeps less than the current reference Iref for a certain time period, the current control signal Ictrl maintains at the first status, and the selection circuit 222 selects the operation signal Vcal as the voltage reference Vref. That is, the voltage reference Vref is generated based on the sum of the expected voltage signal Vtarg and the slope compensation signal Slope1 (Vtarg+Slope1). Otherwise, when the current feedback signal Imon is greater than the current reference Iref, the current control signal Ictrl transits to at the second status, and the selection circuit 222 selects the expected voltage signal Vtarg as the voltage reference Vref. In the embodiment of FIG. 3, the operation circuit 250 further comprises a selection circuit 212. The selection circuit 212 selects an operation signal Ical or the expected total current signal Itarg as the current reference Iref based on the current control signal Ictrl. The operation signal Vcal is provided based on the sum of the expected total current signal Itarg and the slope compensation signal slope2 (Itarg+Slope2). In one embodiment, when the current feedback signal Imon keeps less than the current reference Iref for the certain time period, the current control signal Ictrl remains at the first status, and the selection circuit 212 selects the expected total current signal Itarg as the current reference Iref. Otherwise, when the current feedback signal Imon is greater than the current reference Iref, the current control signal Ictrl transits to at the second status, and the selection circuit 212 selects the operation signal Ical as the current reference Iref. That is, the current reference Iref is provided based on the sum of the expected current signal Itarg and the slope compensation signal Slope2 (Itarg+Slope2).

Figure 4:
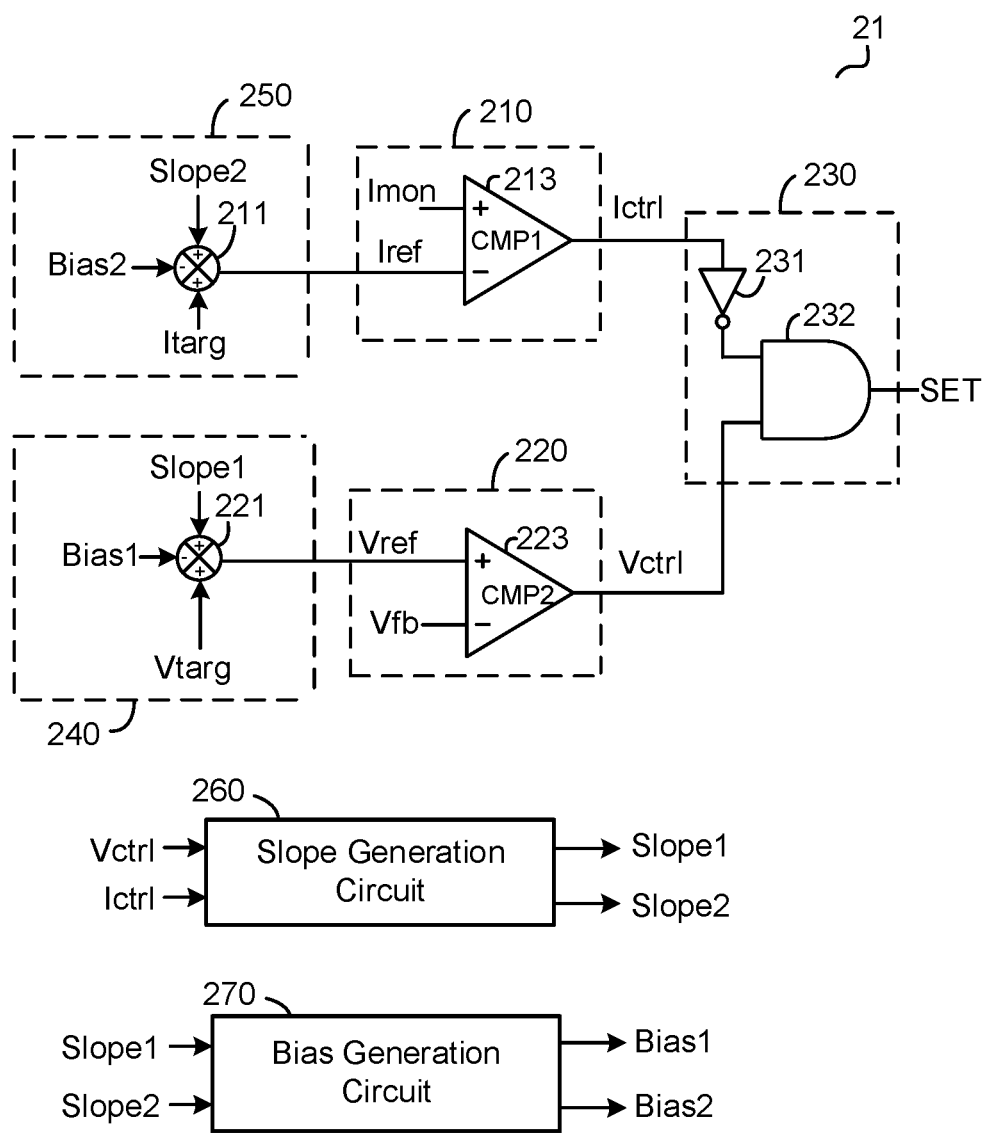
FIG. 4 is a schematic diagram of the set generation circuit 21 in accordance with another embodiment of the present invention.

FIG. 4 is a schematic diagram of a set generation circuit 21 in accordance with another embodiment of the present invention. In the embodiment of FIG. 4, the voltage reference Vref equals the expected voltage signal Vtarg adds the slope compensation signal slope1, and then minus the bias signal Bias1 (Vtarg+Slope1−Bias1). The current reference Iref equals the expected current signal Itarg adds the slope compensation signal slope2, and then minus the bias signal Bias2 (Itarg+Slope2−Bias2). The adder 221 receives the expected voltage signal Vtarg, the slope compensation signal Slope1 and the bias signal Bias1, and provides the voltage reference Vref accordingly. The adder 211 receives the expected total current signal Itarg, the slope compensation signal Slope1 and the bias signal Bias2, and provides the current reference Iref accordingly.

In the embodiment of FIG. 4, the set signal generation circuit 21 further comprises a bias generation circuit 270. In one embodiment, the bias generation circuit 270 provides the bias signal Bias1 based on the slope compensation signal Slope1, and provides the bias signal Bias2 based on the slope compensation signal Slope2. For example, the bias signal Bias1 is equal to the amplitude of the slope compensation signal Slope1, and the bias signal Bias2 is equal to the amplitude of the slope compensation signal Slope2.

Figure 5:
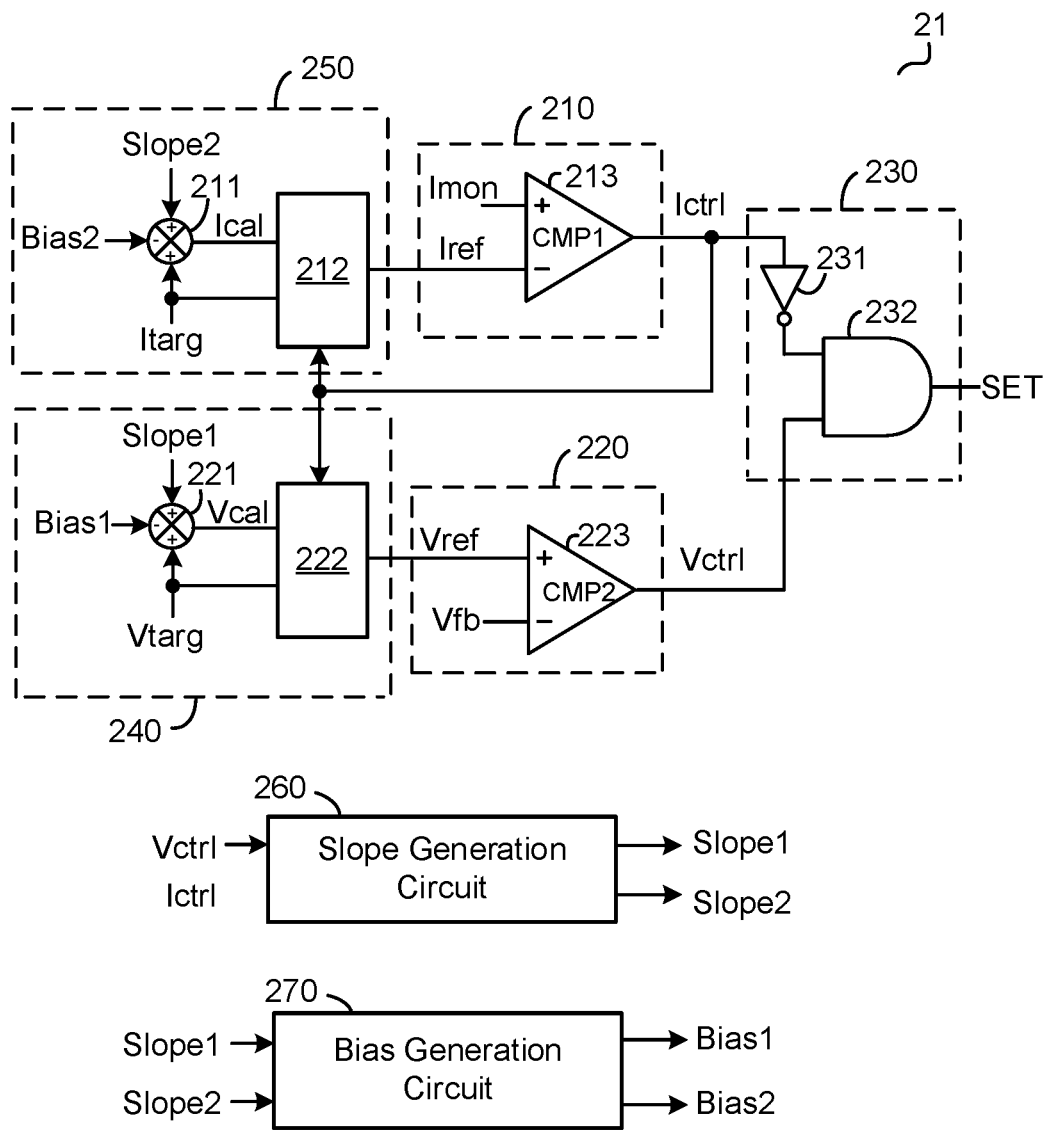
FIG. 5 is a schematic diagram of the set generation circuit 21 in accordance with another embodiment of the present invention.

FIG. 5 is a schematic diagram of a set generation circuit 21 in accordance with another embodiment of the present invention. In the embodiment of FIG. 5, the adder 221 receives the expected voltage signal Vtarg, the slope compensation signal Slope1 and the bias signal Bias1, and provides the operation signal Vcal accordingly. The operation signal Vcal equals the expected voltage signal Vtarg adding the slope compensation signal Slope1, and then minus the bias signal Bias1 (Vtarg+Slope1−Bias1). The operation circuit 240 further comprises a selection circuit 222. The selection circuit 222 selects the operation signal Vcal or the expected voltage signal Vtarg as the voltage reference Vref according to the current control signal Ictrl. When the current feedback signal Imon maintains less than the current reference Iref for the certain time period, the current control signal Ictrl keeps at the first status, and the operation circuit 240 selects the operation signal Vcal as the voltage reference Vref. That is, the voltage reference Vref equals the expected voltage signal Vtarg adds the slope compensation signal Slope1, and then minus the bias signal Bias1 (Vtarg+Slope1−Bias1). Otherwise, when the current feedback signal Imon is greater than the current reference Iref, the operation circuit 240 selects the expected voltage signal Vtarg as the voltage reference Vref. In the embodiment shown in FIG. 5, the operation circuit 211 receives the expected total current signal Itarg, the slope compensation signal Slope1 and the bias signal Bias2, and provides the operation signal Ical at the output. The operation signal Ical equals the expected total current signal Itarg adds the slope compensation signal Slope2, and then minus the bias signal Bias2 (Itarg+Slope2−Bias2). The operation circuit 250 further comprises a selection circuit 212. The selection circuit 212 selects the operation signal Ical or the expected total current signal Itarg as the current reference Iref according to the current control signal Ictrl. When the current feedback signal Imon maintains less than the current reference Iref for the certain time period, the current control signal Ictrl keeps in the first state, and the operation circuit 250 selects the expected total current signal Itarg as the voltage reference Iref. Otherwise, when the current feedback signal Imon is greater than the current reference Iref, the operation circuit 250 selects the operation signal Ical as the current reference Iref. That is, the current reference Iref quals the expected current signal Itarg adds the slope compensation signal Slope2, and then minus the bias signal Bias2 (Itarg+Slope2−Bias2).

Figure 6:
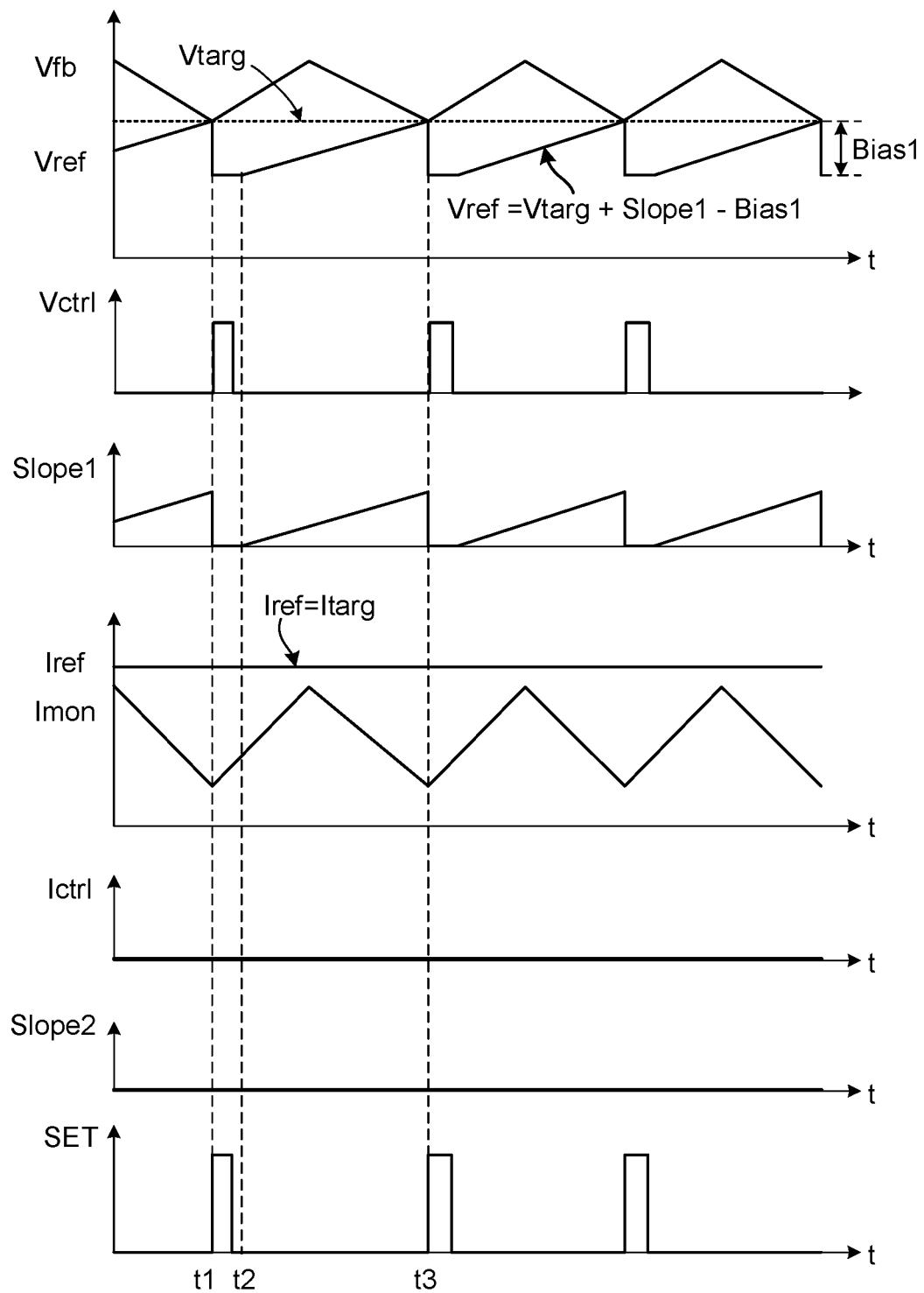
FIG. 6 shows waveforms of the multiphase switching converter 100 shown in FIG. 1 in accordance with an embodiment of the present invention.

FIG. 6 shows waveforms of the multiphase switching converter 100 shown in FIG. 1 in accordance with an embodiment of the present invention. From top to bottom, FIG. 6 shows the voltage feedback signal Vfb, the voltage reference Vref, the voltage control signal Vctrl, the slope compensation signal Slope1, the current reference Iref, the current feedback signal Imon, the current control signal Ictrl, the slope compensation signal Slope2 and the set signal SET. In FIG. 6, the current feedback signal Imon maintains less than the current reference Iref, the current control signal Ictrl maintains low, and the slope compensation signal Slope2 is at a first initial value, e.g., zero. The voltage reference Vref equals subtracting the bias signal Bias1 from the sum of the expected voltage signal Vtarg and the slope compensation signal Slope1, and the current reference Iref equals to the expected total current signal Itarg. The controller 20 provides a set signal SET via comparing the voltage feedback signal Vfb with the voltage reference Vref. As shown in FIG. 6, when the voltage feedback signal Vfb is less than the voltage reference Vref, the voltage control signal Vctrl becomes high, thus the set signal SET becomes high, and the controller 20 turns on the corresponding switching circuit.

As shown in FIG. 6, at time t1, the controller 20 turns on the corresponding switching circuit based on the output voltage Vo, the slope compensation signal Slope1 maintains at a second initial value for a time period t2-t1, and then gradually increases with a first slope for a time period t3-t2. At time t3, the controller 20 turns on a next subsequent switching circuit based on the output voltage Vo, and the slope compensation signal Slope1 restores the second initial value as at time t1. In one example, the first initial value and the second initial value of the slope compensation signal Slope1 could be but not limited to zero.

Figure 7:
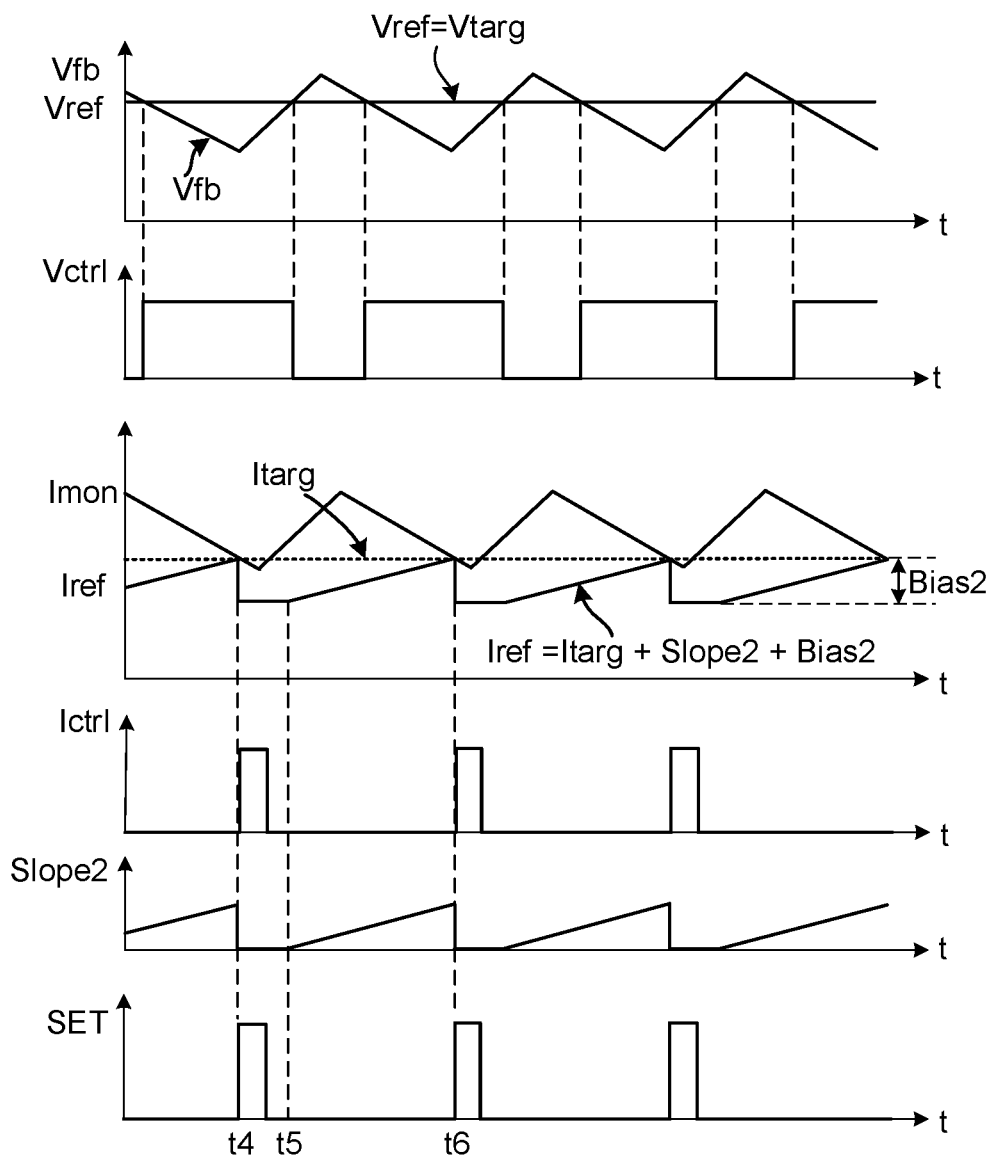
FIG. 7 shows waveforms of the multiphase switching converter 100 shown in FIG. 1 in accordance with another embodiment of the present invention.

FIG. 7 shows waveforms of the multiphase switching converter 100 shown in FIG. 1 in accordance with another embodiment of the present invention. From top to bottom, FIG. 7 shows the voltage feedback signal Vfb, the voltage reference Vref, the voltage control signal Vctrl, the slope compensation signal Slope1, the current feedback signal Imon, the current reference Iref, the current control signal Ictrl, the slope compensation signal Slope2 and the set signal SET. As shown in FIG. 7, when the current feedback signal Imon is greater than the current reference Iref, the voltage reference Vref is equal to the expected voltage signal Vtarg, the current reference Iref equals subtracting the bias signal Bias2 from the sum of the expected total current signal Itarg and the slope compensation signal Slope2. The set signal SET remains low, thus the corresponding switching circuit remains off temporarily, even if the voltage feedback signal VFB is less than the voltage reference VREF. Until the current feedback signal Imon decreases to less than the current reference Iref, the current control signal Ictrl becomes high and the set signal SET becomes high to turn on the corresponding switching circuit.

In one embodiment, when the corresponding switching circuit is turned on based on the total current Io at time t4, the slope compensation signal Slope2 maintains at the first initial value from time t4 to time t5, and then gradually increases with a second slope from time t5 to time t6. At time t6, the controller turns on the next subsequent switching circuit based on the total current Io, and the slope compensation signal Slope2 restores the first initial value as at time t4. The second slope can be the same as the first slope, or be different from the first slope.

Figure 8A:
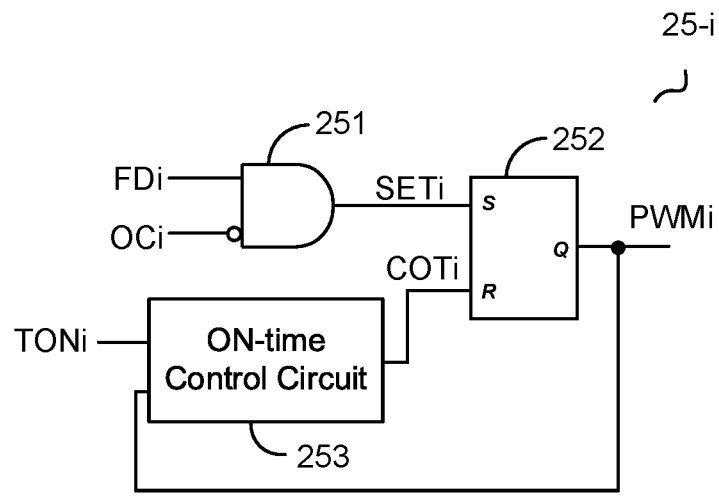
FIG. 8A is a schematic diagram of a sub control circuit 25-$i$ in accordance with an embodiment of the present invention.

FIG. 8A is a schematic diagram of a sub control circuit 25-i in accordance with an embodiment of the present invention. As shown in FIG. 8A, the sub control circuit 25-i comprises a logic circuit 251 and a RS flip-flop 252. The logic circuit 251 has a first input terminal, a second input terminal and an output terminal. The first input terminal of the logic circuit 251 is coupled to the corresponding output terminal of the frequency division circuit 22 to receive the frequency division signal FDi. The second input terminal of the logic circuit 251 receives the overcurrent signal OCi. And the output terminal of the logic circuit 251 provides the sub set signal SETi according to the frequency division signal FDi and the overcurrent signal OCi. The RS flip-flop 252 has a set terminal S, a reset terminal R, and an output terminal Q. The set terminal S is coupled to the logic circuit 251 to receive the sub set signal SETi. The reset terminal R receives an on-time control signal COTi to control an on-time period of the corresponding switching circuit 10-$i$. And the output terminal Q is coupled to the corresponding switching circuit 10-$i$ to provide the switching control signal PWMi. The corresponding switching circuit is turned on based on the frequency division signal FDi and the overcurrent signal OCi, and turned off based on the on-time control signal COTi. When the overcurrent signal OCi indicates that the corresponding switching circuit 10-$i$ is overcurrent, the corresponding switching circuit 10-$i$ will not be turned on.

In one embodiment, the sub control circuit 25-$i$ further comprises an on-time control circuit 253. The on-time control circuit 253 provides the on-time control signal COTi according to the switching control signal PWMi and an on-time signal TONi to control the on-time period of the corresponding switching circuit 10-$i$. The on-time signal TONi of the switching circuit 10-$i$ may be a constant value or a variable value related to the input voltage Vin and/or the output voltage Vo.

Figure 8B:
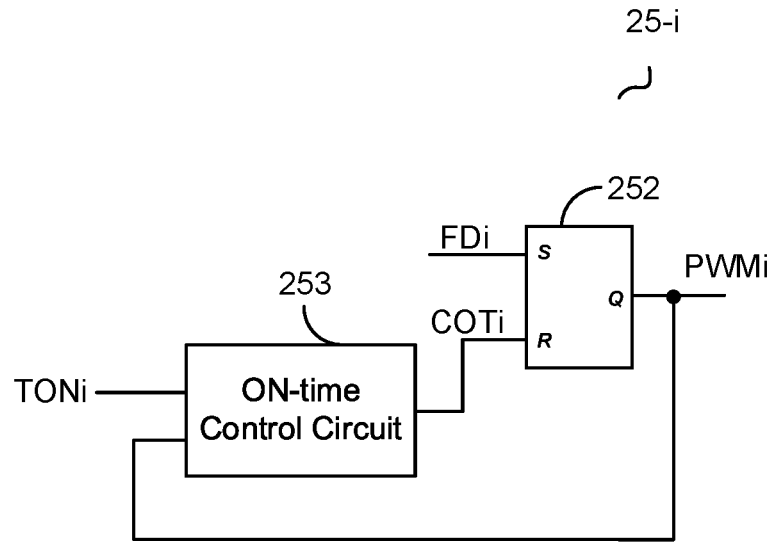
FIG. 8B is a schematic diagram of the sub control circuit 25-$i$ in accordance with another embodiment of the present invention.

FIG. 8B is a schematic diagram of the sub control circuit 25-$i$ in accordance with another embodiment of the present invention. As shown in FIG. 8B, the sub control circuit 25-$i$ comprises the RS flip-flop 252 and the on-time control circuit 253. The set terminal S of the RS flip-flop 252 is coupled to the frequency division circuit 22 to receive the corresponding frequency division signal FDi. Thus the corresponding switching circuit is turned on based on the frequency division signal FDi.

Figure 9:
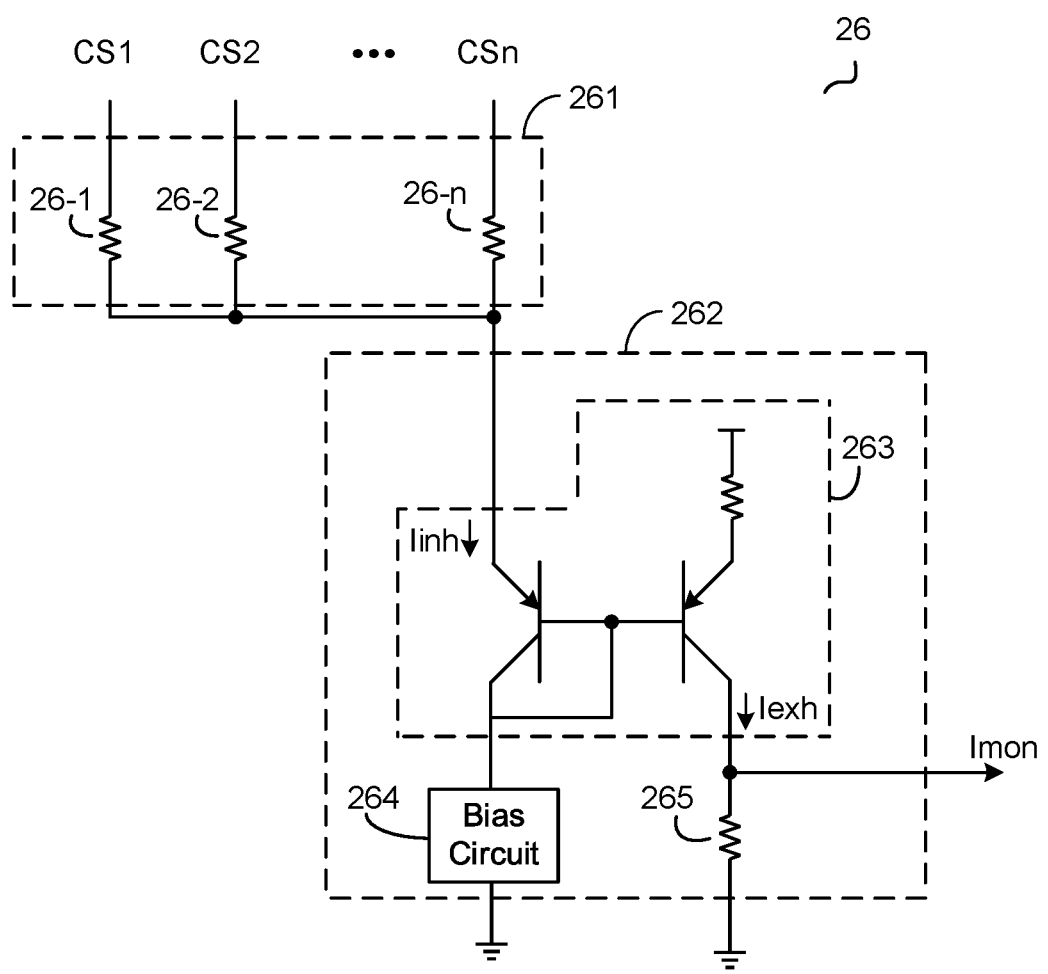
FIG. 9 is a schematic diagram of a total current calculation circuit 26 in accordance with an embodiment of the present invention.

FIG. 9 is a schematic diagram of a total current calculation circuit 26 in accordance with an embodiment of the present invention. In one embodiment, the total current calculation circuit 26 comprises a current adding circuit 261 and an output circuit 262. The current adding circuit 261 is coupled to the plurality of switching circuits 10-1, 10-2 . . . 10-$n$ to receive the plurality of current sensing signals CS1, CS2 . . . CSn and provides a current adding signal Iinh accordingly, to represent sum of the plurality of current sensing signals CS1+CS2+ . . . +CSn. The output circuit 262 provides a current feedback signal Imon based on the current adding signal Iinh. In one embodiment, the current adding circuit 261 comprises a plurality of resistors 26-1, 26-2 . . . 26-$n$. One terminal of each resistor 26-$i$ (i=1, 2 . . . n) receives the corresponding current sensing signal CSi, and the other terminal of each resistor 26-$i$ are coupled together to provide the current adding signal Iinh. In one embodiment, the output circuit 262 comprises a current mirror 263, a bias circuit 264, and an output resistor 265. An input terminal of the current mirror 263 receives the current adding signal Iinh, a bias terminal of the current mirror 263 is coupled to the bias circuit 264, and an output terminal of the current mirror 263 provides a mirror current Iexh. The mirror current Iexh flows through the output resistor 265 to provide the current feedback signal Imon. In one embodiment, the current feedback signal Imon could be represented by the following formula (1).

$$Imon = Gain*(CS1+CS2+ \ldots +CSn)+Bias \quad (1)$$

Where signal Bias represents the voltage at the bias terminal of the output circuit 262. Signal Gain represents the gain brought by the current adding circuit 261 and the current mirror 263.

Figure 10:
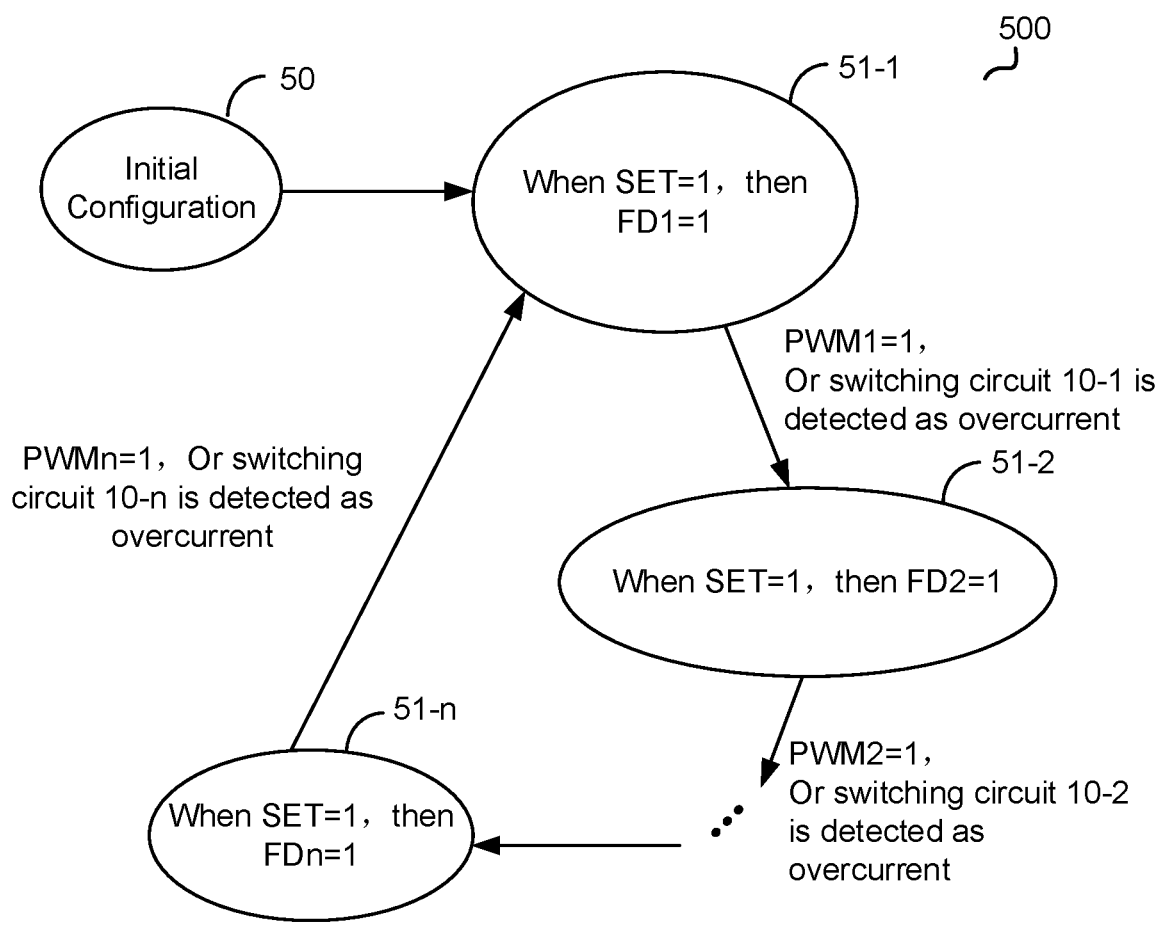
FIG. 10 shows a state transition diagram 500 of a frequency divider 22 shown in FIG. 1 in accordance with an embodiment of the present invention.

FIG. 10 shows a state transition diagram 500 of the frequency divider 22 shown in FIG. 1 in accordance with an embodiment of the present invention, comprising a states 50, and states 51-1, 51-2, . . . 51-$n$.

At the state 50, the frequency division circuit 22 executes an initial configuration, after the initial configuration, transiting to the state 51-1.

At the state 51-1, when the set signal SET is high, then the frequency division signal FD1 is high. When the switching control signal PWM1 turns on the switching circuit 10-1, such as PWM1=1, or when the switching circuit 10-1 is detected as overcurrent, then transiting to the state 51-2.

At the state 51-2, when the set signal SET is high, then the frequency division signal FD2 is high. When the switching control signal PWM2 turns on the switching circuit 10-2, such as PWM2=1, or when the switching circuit 10-2 is detected as overcurrent, then transiting to a next state.

At the state 51-$n$, when the set signal SET is high, then the frequency division signal FDn is high. When the switching control signal PWMn turns on the switching circuit 10-$n$, such as PWMn=1, or when switching circuit 10-$n$ is detected as overcurrent, then transiting back to the state 51-1.

Figure 11:
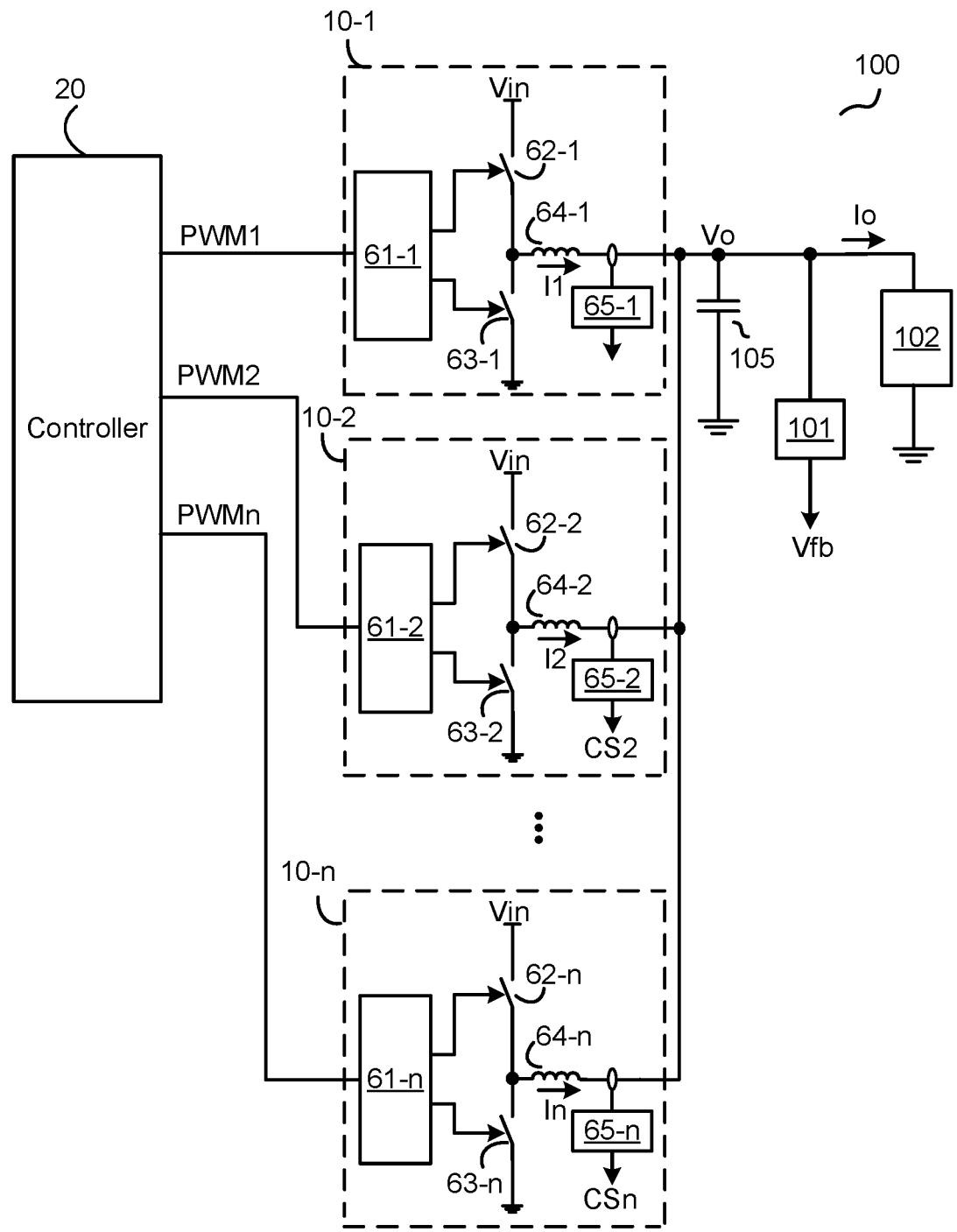
FIG. 11 is a schematic block diagram of the multiphase switching converter 100 in accordance with another embodiment of the present invention.

FIG. 11 is a schematic block diagram of the multiphase switching converter 100 in accordance with another embodiment of the present invention. As shown in FIG. 6, the switching circuit 10-$i$ (i=1, 2 . . . n) comprises a driving circuit 61-$i$, an high-side switch 62-$i$, a low-side switch 63-$i$, and an inductor 64-$i$. Each switching circuit 10-$i$ further comprises a current sensing circuit 65-$i$ for sensing a current flowing through the switching circuit 10-$i$, such as a current flowing through the high-side switch 62-$i$, a current flowing through the low-side switch 63-$i$, or a current flowing through the inductor 64-I as shown in FIG. 11. The current sensing circuit 65-$i$ provides the current sensing signal CSi.

Figure 12:
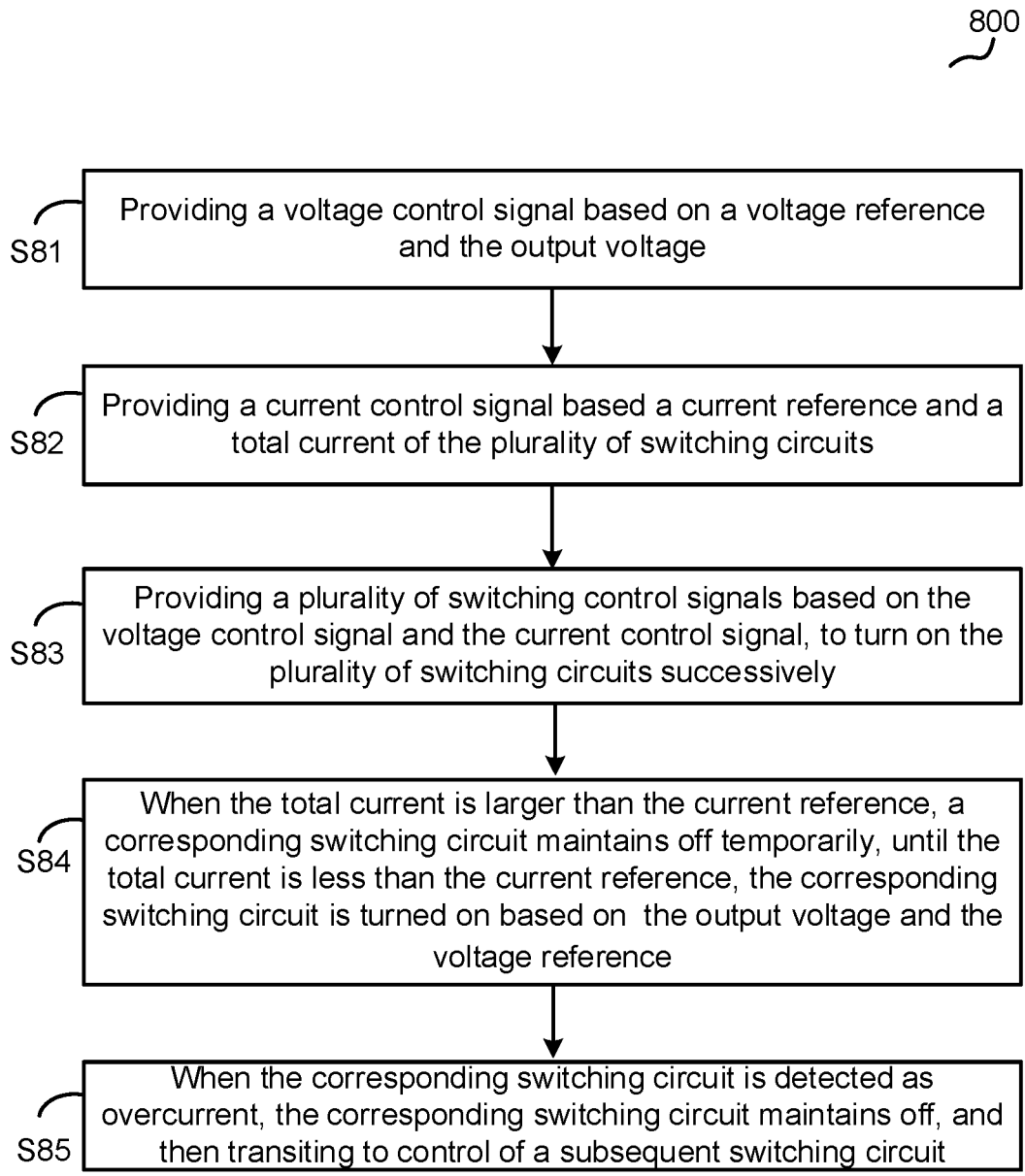
FIG. 12 is a flowchart of a control method 800 for a multiphase switching converter in accordance with an embodiment of the present invention.

FIG. 12 is a flowchart of a control method 800 for a multiphase switching converter in accordance with an embodiment of the present invention, comprising steps S81-S85.

At the step S81, providing a voltage control signal based on the voltage reference and the output voltage.

At the step S82, providing a current control signal based on the current reference and the total current of the plurality of switching circuits.

At the step s83, providing a plurality of switching control signals based on the voltage control signal and the current control signal, to turn on the plurality of switching circuits successively.

At the step S84, when the total current is larger than the current reference, the corresponding switching circuit maintains off temporarily, until the total current is less than the current reference, the corresponding switching circuit is turned on based on the output voltage and the voltage reference.

At step S85, when the corresponding switching circuit is detected as overcurrent, the corresponding switching circuit maintains off, then transiting to control of a subsequent switching circuit.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for a multiphase switching converter, the multiphase switching converter having a plurality of switching circuits coupled together to provide an output voltage, the controller comprising:
    a set generation circuit, configured to provide a set signal based on the output voltage and a total current flowing through the plurality of switching circuits;
    a frequency divider, configured to receive the set signal, and provide a plurality of frequency division signals based on the set signal; and
    a plurality of sub control circuits, configured to provide a plurality of switching control signals to control the plurality of switching circuits respectively, each of the plurality of sub control circuits is configured to receive one of the plurality of frequency division signals and provide a corresponding one of the plurality of switching control signals accordingly, such that when the total current is larger than a current reference, one of the plurality of switching circuits maintains off temporarily, until the total current is less than the current reference, then the one of the plurality of switching circuits is turned on based on the output voltage.

2. The controller of claim 1, further comprising:
    a plurality of overcurrent detection circuits, each of the plurality of overcurrent detection circuits is configured to provide an overcurrent signal to indicate whether a corresponding one of the plurality of switching circuits is overcurrent; wherein
    each of the plurality of sub control circuits is coupled to a corresponding one of the plurality of overcurrent detection circuits to receive the overcurrent signal, when the overcurrent signal indicates that the corresponding one of the plurality of switching circuits is overcurrent, then the corresponding one of the switching circuits maintains off, a subsequent one of the plurality of switching circuits is controlled based on the output voltage and the total current.

3. The controller of claim 2, wherein each of the sub control circuits further comprises:
    a logic circuit, having a first input terminal, a second input terminal, and an output terminal, wherein the first input terminal of the logic circuit is coupled to the frequency divider to receive a corresponding one of the plurality of frequency division signals, the second input terminal of the logic circuit is coupled to the corresponding one of the plurality of overcurrent detection circuits to receive the overcurrent signal, and the output terminal is configured to provide a sub set signal based on the corresponding one of the plurality of frequency division signals and the overcurrent signal; and
    a RS flip-flop, having a set terminal, a reset terminal and an output terminal, wherein the set terminal is coupled to the logic circuit to receive the sub set signal, the reset terminal is configured to receive an on-time control signal for controlling an on-time period of the corresponding one of the plurality of switching circuits, and the output terminal is configured to provide the corresponding one of the plurality of switching control signals.

4. The controller of claim 1, wherein the set generation circuit further comprises:
    a voltage control circuit, configured to provide a voltage control signal based on the output voltage and a voltage reference, the voltage reference is generated based on an expected output voltage and a first slope compensation signal;
    a total current control circuit, configured to provide a current control signal based on the total current and the current reference, the current reference is generated based on an expected total current and a second slope compensation signal; and
    a logic circuit, configured to provide the set signal based on the voltage control signal and the current control signal, when the current control signal is at a first status, the logic circuit is configured to provide the set signal based on the voltage control signal, and when the current control signal is at a second status, the logic circuit is configured to provide the set signal based on the current control signal.

5. The controller of claim 4, wherein the total current control circuit further comprises:
    a first operation circuit, configured to provide the current reference based on a sum of the expected total current and the second slope compensation signal; and
    a first comparison circuit, configured to provide the current control signal via comparing a current feedback signal representative of the total current with the current reference.

6. The controller of claim 4, wherein:
    when the corresponding one of the plurality of switching circuits is turned on based on the output voltage, the first slope compensation signal maintains at a first value for a first time period, and then increases with a first slope; and
    when the corresponding one of the plurality of switching circuits is turned on based on the total current, the second slope compensation signal maintains at a second value for a second time period, and then increases with a second slope.

7. The controller of claim 4, wherein the voltage control circuit further comprises:
    a second operation circuit, configured to provide the voltage reference based on a sum of the expected output voltage and the first slope compensation signal; and
    a second comparison circuit, configured to provide the voltage control signal via comparing a voltage feedback signal representative of the output voltage with the voltage reference.

8. A control method for a multiphase switching converter, the multiphase switching converter having a plurality of switching circuits coupled together to provide an output voltage, the control method comprising:
    providing a voltage control signal based on the output voltage and a voltage reference;

providing a current control signal based on a total current flowing through the plurality of switching circuits and a current reference;

providing a set signal based on the voltage control signal and the current control signal;

providing a plurality of switching control signals based on the set signal, to turn on the plurality of switching circuits successively; and turning off a corresponding one of the plurality of switching circuits based on an on-time control signal to control an on-time period of the corresponding one of the plurality of switching circuits; wherein when the total current is larger than the current reference, the corresponding one of the plurality of switching circuits maintains off temporarily, until the total current is less than the current reference, the corresponding one of the plurality of switching circuits is turned on based on the output voltage.

9. The control method of claim 8, wherein:

when the corresponding one of the plurality of switching circuits is detected as overcurrent, maintaining the corresponding one of the plurality of switching circuits off, and transiting to control a subsequent one of the plurality of switching circuits based on the voltage control signal and the current control signal.

10. The control method of claim 8, further comprising:

providing the voltage reference based on a sum of an expected output voltage and a first slope compensation signal.

11. The control method of claim 10, wherein when the corresponding one of the plurality of switching circuits is turned on based on the output voltage, the first slope compensation signal maintains at a first value for a first time period, and then increases with a first slope.

12. The control method of claim 8, further comprising:

providing the current reference based on a sum of an expected total current and a second slope compensation signal.

13. The control method of claim 12, wherein when the corresponding one of the plurality of switching circuits is turned on based on the total current, the second slope compensation signal maintains at a second value for a second time period, and then increases with a second slope.

14. A multiphase switching converter, comprising:

a plurality of switching circuits coupled together to provide an output voltage; and a controller, configured to provide a plurality of switching control signals to turn on the plurality of switching circuits successively based on the output voltage and a total current flowing through the plurality of switching circuits; wherein when the total current is larger than a current reference, a corresponding one of the plurality of switching circuits maintains off temporarily, until the total current is less than the current reference, the corresponding one of the plurality of switching circuits is turned on based on the output voltage.

15. The multiphase switching converter of claim 14, wherein the controller further comprises:

a voltage control circuit, configured to provide a voltage control signal based on the output voltage and a voltage reference; and a total current control circuit, configured to provide a current control signal based on the total current and the current reference; wherein when the current control signal is at a first status, the corresponding one of the plurality of switching circuits is turned on based on the voltage control signal, and when the current control signal is at a second status, the corresponding one of the plurality of switching circuits is turned on based on the current control signal.

16. The multiphase switching converter of claim 15, wherein the voltage reference is generated based on an expected output voltage and a first slope compensation signal, and when the corresponding one of the plurality of switching circuits is turned on based on the output voltage, the first slope compensation signal maintains at a first value for a first time period, and then increases.

17. The multiphase switching converter of claim 15, wherein the current reference is generated based on an expected total current and a second slope compensation signal, and when the corresponding one of the plurality of switching circuits is turned on based on the total current, the second slope compensation signal maintains at a second value for a second time period, and then increases.

18. The multiphase switching converter of claim 14, wherein the controller further comprises:

a set generation circuit, configured to provide a set signal based on the output voltage and the total current;

a frequency divider, configured to receive the set signal, and provide a plurality of frequency division signals based on the set signal; and a plurality of sub control circuits, configured to provide the plurality of switching control signals, each of the plurality of sub control circuits is configured to receive one of the plurality of frequency division signals and provide a corresponding one of the plurality of switching control signals accordingly.

19. The multiphase switching converter of claim 18, wherein the controller further comprises:

a plurality of overcurrent detection circuits, each of the plurality of overcurrent detection circuits is configured to provide an overcurrent signal to indicate whether a corresponding one of the plurality of switching circuits is overcurrent; wherein each of the plurality of sub control circuits is coupled to a corresponding one of the plurality of overcurrent detection circuits to receive the overcurrent signal, when the overcurrent signal indicates that the corresponding one of the plurality of switching circuits is overcurrent, then the corresponding one of the switching circuits maintains off, a subsequent one of the plurality of switching circuits is controlled based on the voltage control signal and the current control signal.

20. The multiphase switching converter of claim 19, wherein each of the sub control circuits further comprises:

a logic circuit, configured to receive a corresponding one of the plurality of frequency division signals and the overcurrent signal, and provide a sub set signal based on the corresponding one of the plurality of frequency division signals and the overcurrent signal; and a RS flip-flop, configured to receive the sub set signal and an on-time control signal, and provide the corresponding one of the plurality of switching control signals based on the sub-set signal and the on-time control signal, wherein the on-time control signal controls an on-time period of the corresponding one of the plurality of switching circuits.

21. A controller for a multiphase switching converter, the multiphase switching converter having a plurality of switching circuits coupled together to provide an output voltage, the controller comprising:

a set generation circuit, configured to provide a set signal based on the output voltage and a total current flowing through the plurality of switching circuits; wherein the controller is configured to provide a plurality of switching control signals to turn on the plurality of switching circuits successively based on the set signal; wherein when the total current is larger than a current reference, a corresponding one of the plurality of switching circuits maintains off temporarily, until the total current is less than the current reference, the corresponding one of the plurality of switching circuits is turned on based on the output voltage.

* * * * *